July 23, 1935.  R. C. PIERCE  2,009,149
AUTOMOBILE CAR
Filed Jan. 27, 1932   5 Sheets-Sheet 2
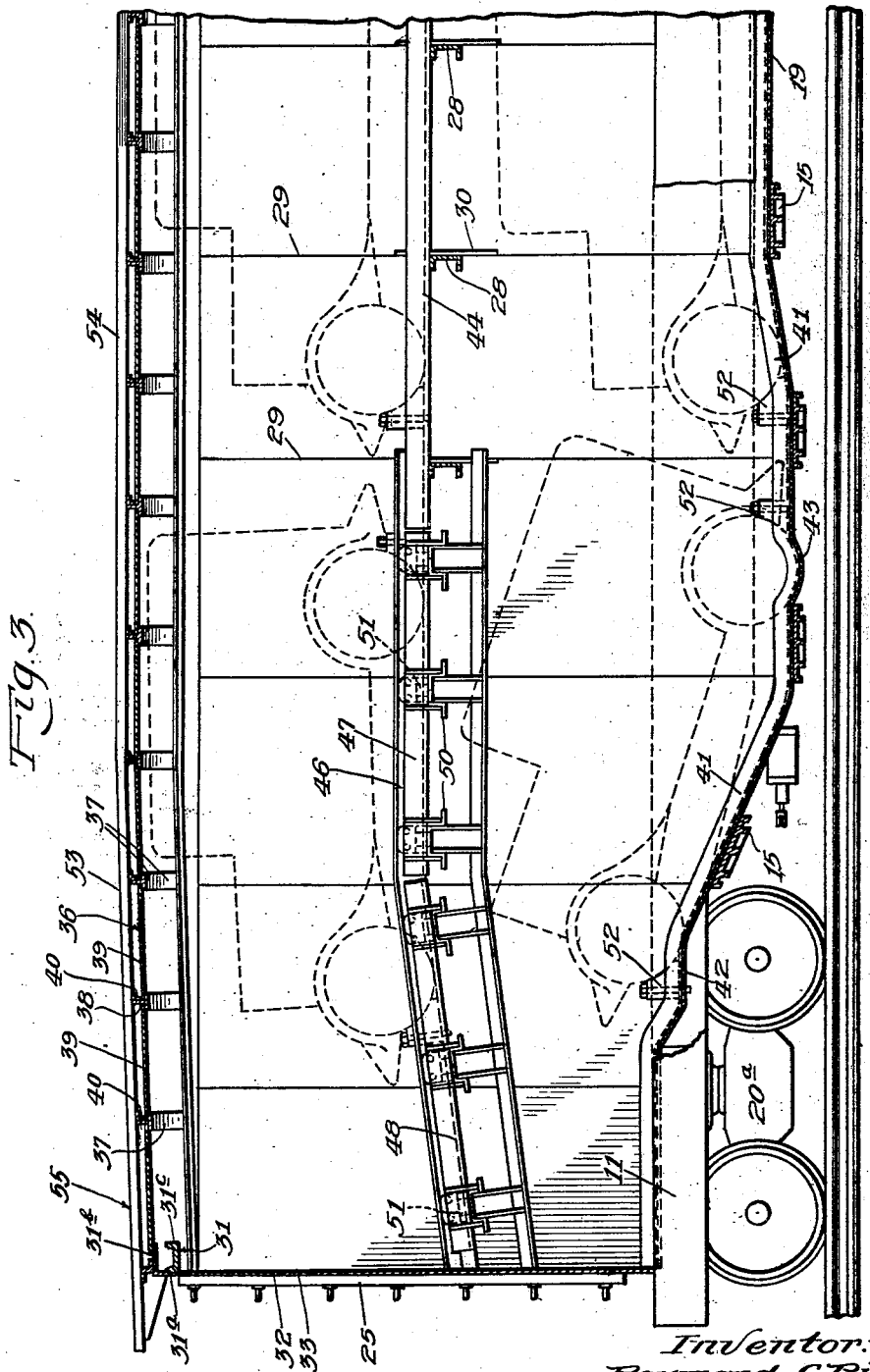
Inventor:
Raymond C. Pierce,
By Dyrenforth, Lee, Chritton & Wiles,
Attorneys.

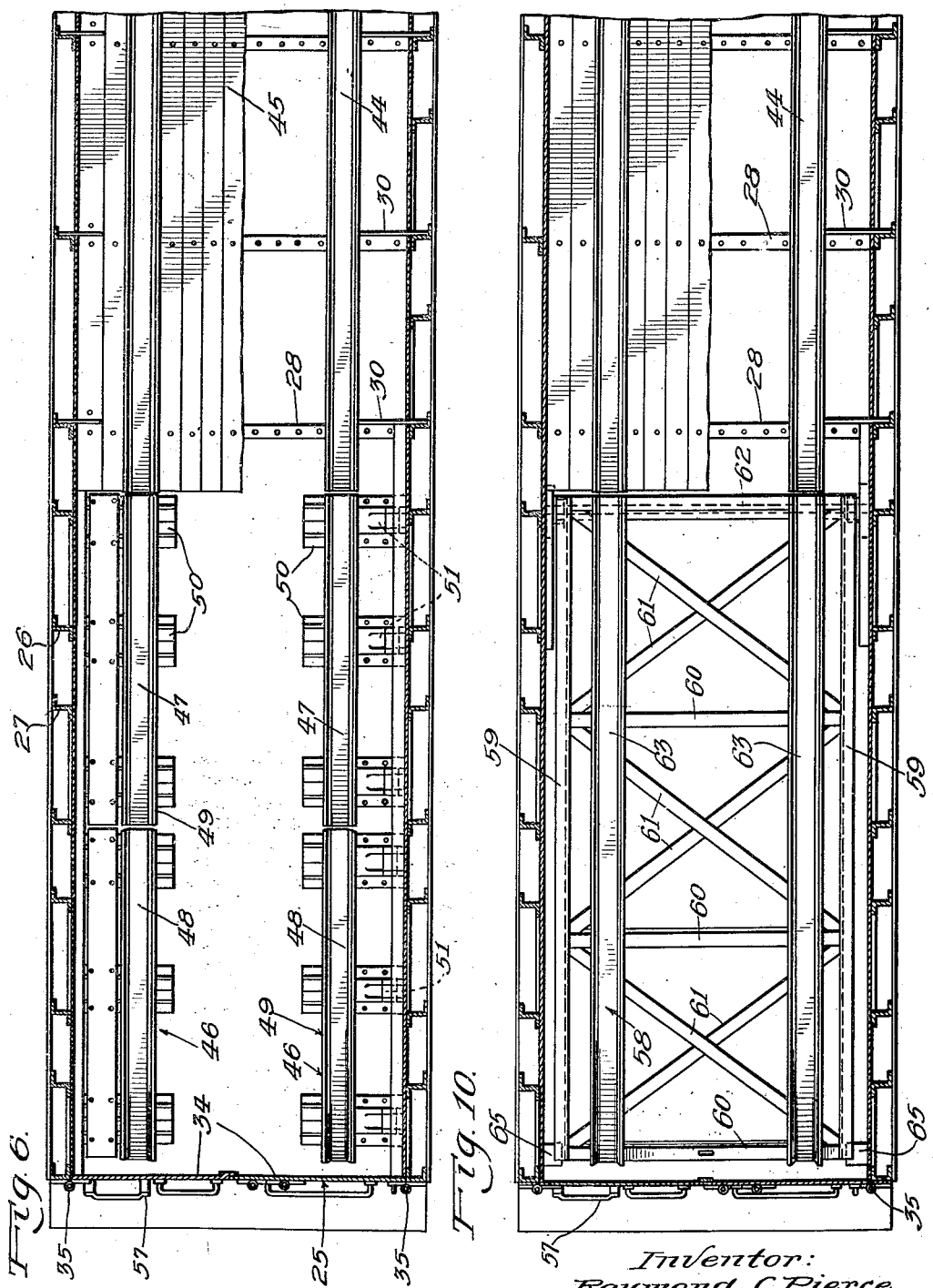

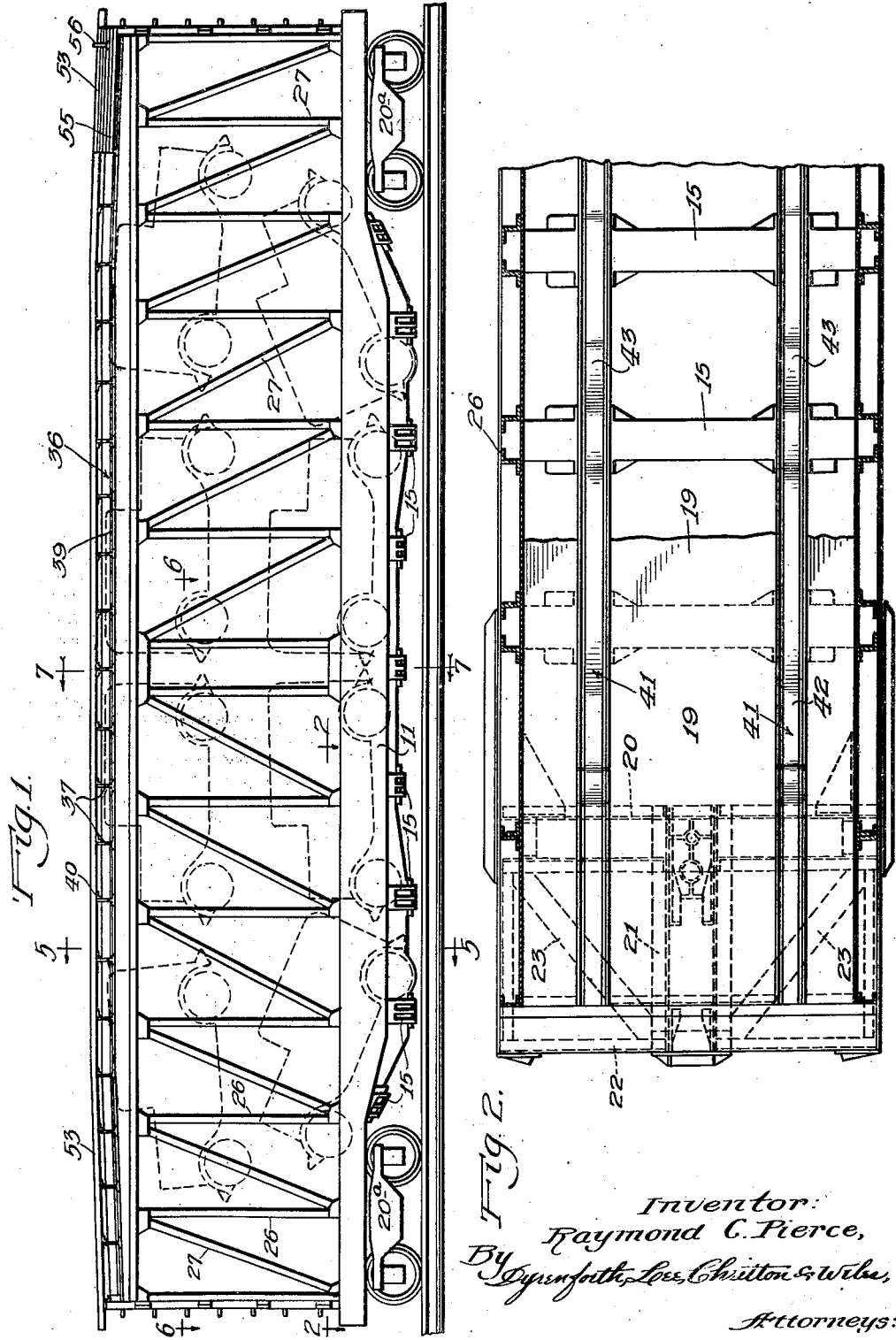

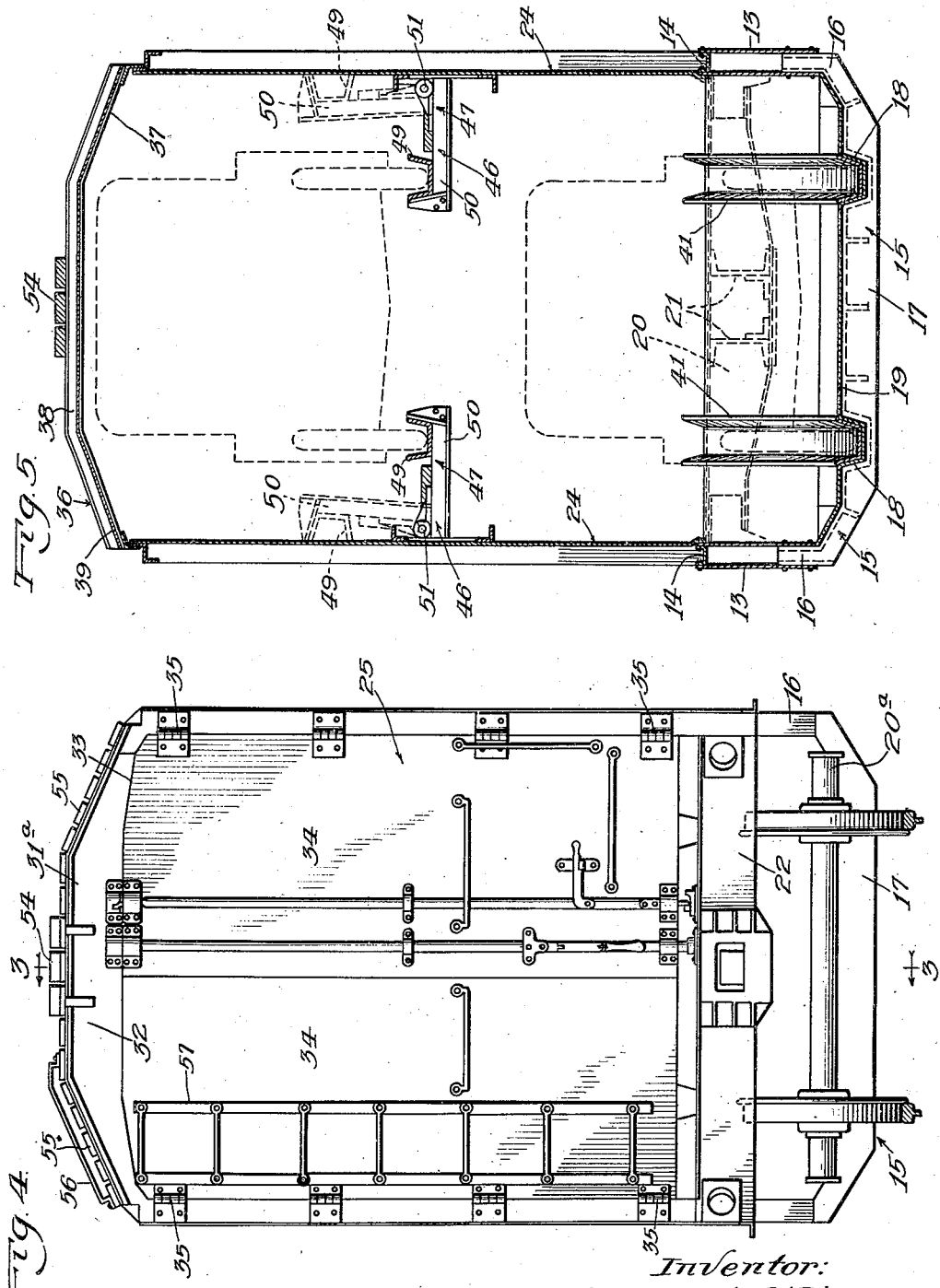

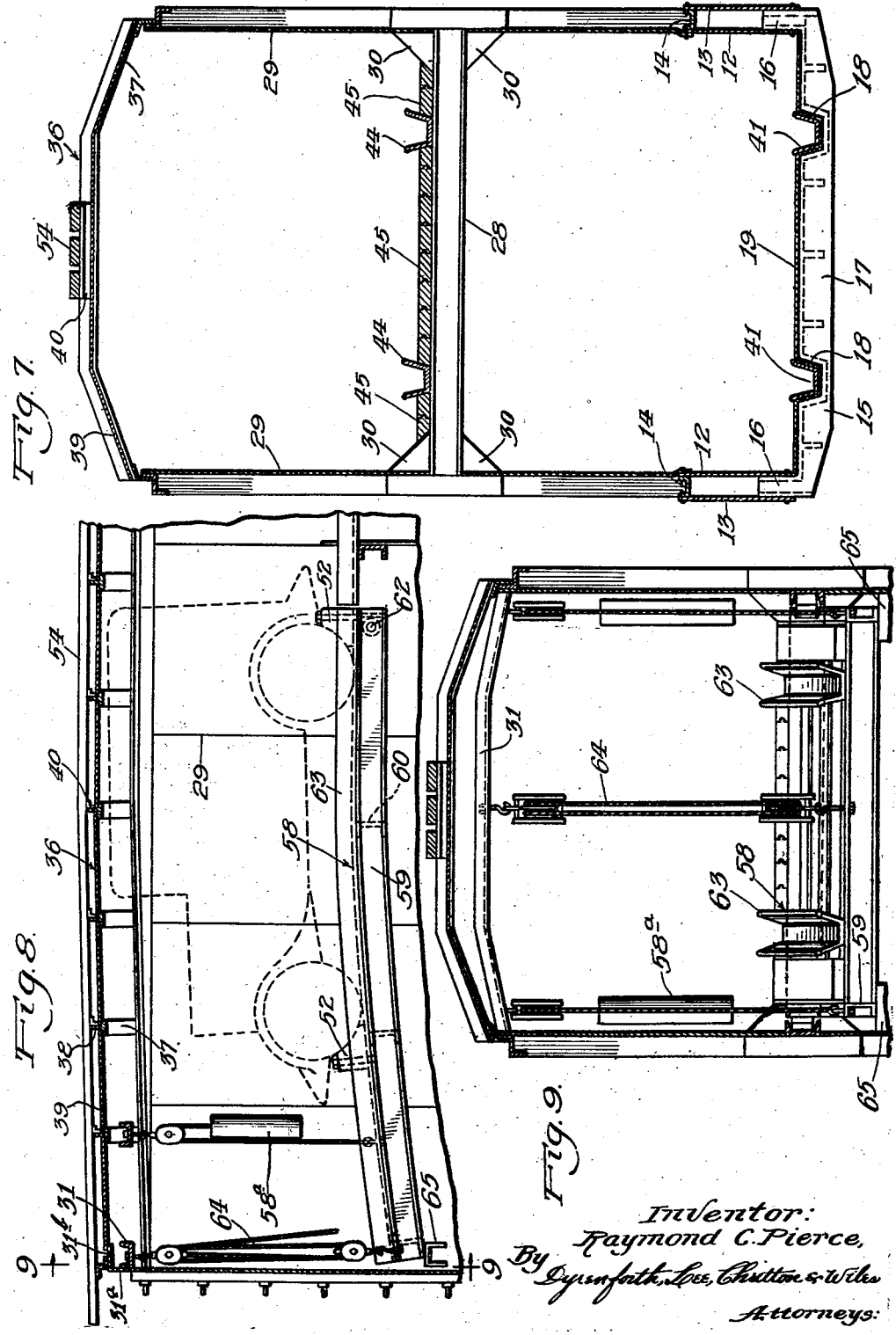

Patented July 23, 1935

2,009,149

UNITED STATES PATENT OFFICE 2,009,149

AUTOMOBILE-CAR

Raymond C. Pierce, Chicago, Ill., assignor to General American Tank Car Corporation, a corporation of West Virginia Application January 27, 1932, Serial No. 589,276

20 Claims. (Cl. 105—368)

My invention relates to improvements in end loading and unloading cars, and more especially cars for the transportation of automobiles complete with their wheels, and more particularly passenger automobiles and other automobiles of substantially the same height as passenger automobiles.

As will be understood, one of the chief desires of designers of automobile cars is to provide a car of such construction that the maximum number of automobiles may be stored therein, and this has presented a great problem due primarily to the matter of clearance limits prescribed for railway cars, and which has greatly hampered the designing of cars in which automobiles, particularly of the height of closed passenger automobiles, may be arranged in double-decked position in the cars, inasmuch as it is necessary to utilize every available part of the space within the cars to the best advantage.

In the ordinary type of automobile cars, due to the principle of construction employed, it is not possible to build the car so that the complete automobiles with their wheels may be double-decked therein due to the clearance limits prescribed for the cars.

My primary objects are to provide a construction of car in which closed passenger automobiles and others of the same height may be stored in double-decked position in the cars and which will be of the minimum height and such as to come within the prescribed clearance limits for railway cars; to provide a relatively inexpensive and suitably strong construction of such a car; to provide a construction which will require in the loading and unloading of the cars, the minimum of inclined runways outside of the cars; to provide for the sloping of the ends of the roof of the car, while permitting the car to receive the automobiles in double-decked position, to such an extent as to permit the grab-irons to be provided at the ends of the car roof at such elevations from the roof as to meet the prescribed regulations; to provide a construction of railway car in which the lower row of automobiles stored therein may be supported relatively close to the railway track and still provide sufficient clearance to prevent running of the cars aground at their central portions when passing over the tracks of short vertical radii at the tops of the humps of the hump system of classifying cars commonly provided; to provide such a construction of car that a plurality of the cars may be loaded and unloaded at one end of a string thereof while the cars are coupled together; and other objects as will be manifest from the following description:

Referring to the accompanying drawings, Figure 1 is a view in side elevation, with the sideplate portion removed, of an automobile car embodying my invention, this view showing by dotted lines, the automobiles stored in upper and lower rows therein.

Figure 2 is an enlarged sectional view of one of the similar ends of the car, the section being taken at line 2—2 on Fig. 1, and viewed in the direction of the arrows.

Figure 3 is a broken enlarged view in longitudinal sectional elevation of the car of the preceding figures, the section being taken at the line 3—3 on Fig. 4, and viewed in the direction of the arrows.

Figure 4 is a face view of one of the similar ends of the the car.

Figure 5 is an enlarged section taken at line 5—5 on Fig. 1 and viewed in the direction of the arrows.

Figure 6 is a plan sectional view of one of the similar ends of the car, the section taken being at the line 6—6 on Fig. 1 and viewed in the direction of the arrows.

Figure 7 is a cross-sectional view of the car, the section being taken at the line 7—7 on Fig. 1 and viewed in the direction of the arrows.

Figure 8 is a view like Fig. 3 of a modification of the structure of the preceding figures.

Figure 9 is a section taken at the line 9—9 on Fig. 8 and viewed in the direction of the arrows; and Figure 10 is a plan sectional view of the construction shown in Figs. 8 and 9.

Referring to the particular illustrated embodiment of my invention, the under frame of the car comprises fish-belly side sills 11 extending the full length of the car, and each formed of side-plates 12 and 13 spaced apart and channels 14 connecting these plates together at their upper edges, and cross-members or ties 15 located at the lower edges of the side sills 11 and connecting the latter together. The cross-members 15 are of yoke shape, the upwardly-extending arm-portions 16 of these yokes extending upwardly into the spaces between the plates 12 and 13 and being rigidly secured thereto and the upper surfaces of the bases 17 of the yokes containing recesses 18 for a purpose hereinafter described.

The cross-members or ties 15 are located at different points along the side sills 11 as shown more particularly in Fig. 1, the cross-members 15 at the central portion of the car being of less depth than those immediately adjacent thereto so that the bases 17 of the yokes at the center of the car are elevated above the base-portions of the yokes adjacent thereto. The bottom closure for the car comprises sheeting 19 which extends over the cross-members 15 from one side sill to the other and into the recesses 18.

The underframe also comprises bolsters 20, one at each end of the car and with which the trucks 20ª are connected, the bolsters being located between, and connected with, the side sills 11; short center sills 21 at each end of the car connected at its inner end to the adjacent bolster 20, end sills 22 connected at their ends with the side sills 11 and with the outer ends of the short center sills 21, and diagonal braces 23 extending from the outer ends of the bolsters 20 to the outer ends of the short center sills 21 and serving to transmit the forces from the short center sills 21 to the ends of the bolsters 20 and thence longitudinally through the car by means of the side sills 11.

The car is provided with enclosing side walls 24 and end walls 25. The side walls 24 each comprise posts 26 spaced apart lengthwise of the car and secured at their lower ends to the adjacent side sill 11 and diagonal braces 27 between the posts, the walls 24 being braced in a crosswise direction by spaced apart channel-shaped cross-members 28 provided in a horizontal series disposed lengthwise of the car and located substantially at the height desired for the support for the upper row of automobiles, as hereinafter described, and connected at their ends with the posts 26, the series of cross-braces 28 extending short of the ends of the car. The side walls 24 also comprise side-plates 29 forming the enclosures at the sides of the car.

In order to provide great rigidity of the structure comprising the side walls 24 and the cross-braces 28, these cross-braces are rigidly connected with the posts 26 by means of large area gusset-plates 30.

The end walls 25 of the car each comprise a relatively heavy and deep upper beam or girder 31 adjacent the top of the car and connected at its ends with the side walls 24 and comprising the plate portion 31ª and upper and lower flange portions 31ᵇ and 31ᶜ, respectively, and plate-portions 32 attached to the girder 31 and to the end ones of the posts 26, each end wall 24 being provided with an opening 33 through which the automobiles may be loaded into, and unloaded from, the car, these openings being each provided with double doors 34 hingedly supported along their outer edges as represented at 35.

As will be understood from the foregoing description, the super-structure comprising the side walls 24 and end walls 25, provided as stated and braced as described provide a structure presenting, independent of material aid from a roof structure, a high degree of rigidity and resistance to stresses tending to distort it, it being observed that in view of the openings 33 in the end walls 25, the main portions of these walls cannot serve as tying means for the side walls 24.

The roof structure of the car represented at 36 and which it is desired be constructed as shallow as possible and thus of relatively little value as bracing means for the side walls 24, comprises relatively shallow truss members 37 of T-shape in cross-section extending crosswise of the car and arranged in spaced apart relation in a series disposed lengthwise of the car, and secured at their ends to the side walls 24, with their webs 38 projecting upwardly, and plates 39 located between the webs 38 of adjacent truss members 37 and supported on the flanges of these members and held down by angle irons 40 secured to the webs 38.

The support for the lower row of automobiles to be stored in the car is in the form of tracks 41 which extend substantially the full length of the car and are shown as formed of flanged members resting at their ends on the end-portions of the underframe and between their ends on the sheeting 19 in the recesses 18 in the cross members 15. The tracks 41 thus present the substantially straight portions at the ends of the car and the depressed intermediate portions generally following the contour of the series of cross-members 15, as clearly shown in Fig. 3, except for locally depressed portions 42 adjacent each end of the car and locally depressed portions 43 adjacent the lowermost ones of the cross members 15 at each end of the car.

The car is provided with a support located substantially midway the top and bottom thereof for the upper row of automobiles, this support comprising stationary track-forming channels 44 supported on the cross members 28, and extending short of both ends of the car, with planking shown at 45 supported on the cross-members 28 between, and at the sides of, the track-forming channels 44, and forming a floor, and, according to the construction shown in Figs. 1–7, inclusive, movable track-sections at the ends of the stationary tracks 44, represented generally at 46 and each formed of aligning sections 47 and 48. Each section 47 and 48 is formed of a flanged member 49 and a series of cross members or arms 50 secured thereto and hinged as represented at 51 to the adjacent side wall 24 of the car, permitting the sections to be swung into either the full line position shown in Fig. 5 in which they form continuations of the stationary track sections 44, or into the dotted line position therein shown in which they extend laterally outwardly beyond a position in which they would present obstructions to the movement of the automobiles into or out of the cars and forming the lowermost row thereof.

In this connection, it may be stated that one of the features of my invention relates to the provision of the displaceable, terminal, automobile-supporting sections 46 which, preferably, incline downwardly, as shown in Fig. 3, toward the adjacent end of the car, and extend in such a position that unless displaceable, they would interfere with the loading and unloading of the lower row of automobiles, this feature being of advantage as hereinafter described.

In the use of the car, the automobiles are loaded into it onto the lower track 41 to form the lower row of automobiles the end ones thereof facing toward the respective ends of the car as shown, the track sections 46 in such loading being swung up to the dotted line position shown in Fig. 5, the automobiles occupying the positions as shown in the drawings with the front wheels of the end automobiles resting on the depressed portions 42 and the rear wheels thereof on the depressed portions 43 of the track 41.

The track sections 46 are then swung down to the full line position shown in Fig. 5, and the automobiles to form the upper row thereof loaded into the car along inclined runways (not shown) located at the end of the car at which it is to be loaded, the automobiles being rolled along the track-structure for this upper row to become positioned thereon as shown in Figs. 1 and 3.

The automobiles thus loaded into the car to form the upper and lower rows thereof are held against movement along the tracks in transit by any suitable means, as for example, the removable and replaceable blocks, represented at 52.

In the unloading of the car, the upper row of automobiles is first unloaded through one of the open ends of the car and after this has been effected, the track-sections 46 are swung up to the dotted position shown in Fig. 5 to remove these sections from the path of movement of the lower row of automobiles following which this lower row is then unloaded.

As will be understood from the foregoing, the provision of the terminal supporting sections 46 which may be provided as the end automobiles of the lower row face towards opposite ends of the car, permits of the location of the roof at the central part of the car at an elevation no higher than necessary to clear the top of the automobiles positioned directly beneath it and because of the relatively low point at which the tops of the automobiles extend after they pass through the opening at either end of the car, plenty of room is provided for the relatively heavy cross girders 31 at the ends of the car, and the roof may be sloped downwardly towards its opposite ends as shown at 53 for the purpose hereinafter explained. Furthermore, the location of the outer ends of these terminal supporting portions at a relatively low point as is the case where they are provided to incline downwardly permits of the use of a low runway structure for the loading and unloading of the automobiles with the manifest advantage.

The feature of providing for the setting of the lower row of automobiles close to the track is of advantage as it constitutes a factor in determining the height to which the roof of the car must extend to permit of the accommodation in the car of automobiles arranged therein in double-decked position.

Referring now to the feature of sloping the ends of the roof downwardly, this is of advantage in connection with the location of the roof sufficiently low to be within the prescribed clearance limits, inasmuch as cars of this type are required to be provided with ladders and adjacent thereto and to the latitudinal running boards with grab-irons positioned a prescribed distance above the boards beneath them and these irons must be within the clearance limits provided for the cars.

By providing a construction of car as described, the ends of the roof which carries the longitudinal running board 54 and latitudinal running boards 55 at its ends, with grab-irons 56 at the ends of the latitudinal running boards and ladders 57 on the ends of the car, may be sufficiently low, as shown, that the grab-irons 56 extend to the desired height above the running boards 55 without extending above the top of the longitudinal running board 54, at the center of the car.

The feature of upwardly arching the lower track 41 is of advantage as it does not unduly elevate the automobiles thereon and yet provides the desired clearance, to avoid grounding, between the underside of the car at its central portion and the vertically curved tracks at the humps of the hump system for classifying cars as commonly provided. Furthermore, the cross members 15 at this portion of the car, because of their relatively shallow depth, are rendered more rigid than those of the cross members at the ends of the car.

As will be manifest, the storing of the automobiles of the lower row thereof with the end automobiles facing towards the respective ends of the car, permits of the displaceable terminal portions of the upper track to be slanted to a relatively great degree and if desired even to such an extent that the hood portions of the end automobiles of the lower row extend above the plane of support of the end automobiles of the upper row.

Cars constructed in accordance with the preferred embodiment of my invention may be loaded and unloaded from either end and, if desired, loaded and unloaded through one end of a string of the cars by utilizing any suitable bridging structures between the cars of the string and having portions over which the automobiles may pass from one car to the other.

Furthermore, it is possible to effect such loading and unloading while the cars are coupled together, inasmuch as the doors 34 are hinged at such distances, as shown, from the extreme ends of the cars that the doors at adjacent ends of the coupled cars may be swung to open position without uncoupling the cars.

It is preferred that each displaceable terminal support portion for the upper row of automobiles be formed of a plurality of separately manipulatable sections as shown in Figs. 1–7, inclusive, as this permits of the changes of slope of the automobile supporting portion and permits of the ready handling of these portions with the minimum of labor. However, if desired, these terminal portions may be provided of other forms, as for example as shown in Figures 8, 9 and 10, wherein the terminal portions are each in the form of a unit structure and represented generally at 58 arched lengthwise thereof and comprising a framework having side members 59, cross members 60 and cross braces 61 secured together, and hinged at 62 to a stationary part of the structure, and tracks 63 shown as formed of channels mounted on the framework just described and aligning with the channel tracks 44, these terminal portions being preferably counterweighted as shown at 58ª in Figs. 8 and 9. Any suitable means may be provided for raising and lowering the outer ends of these terminal supporting portions 58, as for example block and tackle apparatus such as that shown at 64 and supported from the girder 31 and connected with the adjacent outer one of the cross members 60, stops shown at 65 and supported on the sides of the car serving to support the pivoted terminal portion 58 in lowered position.

The car shown is of the construction preferred where the clearance limits for the cars are the minimum. Where the clearance limits are greater the terminal portions of the support for the upper row of cars may, if desired, be on the level with the main portion of this support, and displaceable to remove obstruction to the loading and unloading of the lower row of automobiles, and/or the roof on the same level throughout its extent.

While I have illustrated and described certain forms of structure embodying my invention, I do not wish to be understood as limiting it thereto, as the same may be variously modified and altered and the invention embodied in other forms of structure without departing from the spirit thereof.

What I claim as new, and desire to secure by Letters Patent, is:

1. Automobile storage means comprising a lower support for a lower row of automobiles and an upper support for an upper row of automobiles to which latter the automobiles are applied through an opening at the upper elevation, structural means restricting the height of said opening, said upper support having a relatively long fixed portion and having a normally inclined terminal portion extending therefrom within the space occupied by the stored automobiles and into the path of the automobiles in moving to and from the lower support and adapted for removal from said path so as to provide clearance for travel of automobiles through said opening.

2. Automobile storage means comprising supports for supporting automobiles in vertically spaced rows and having an entrance opening for each row, the terminal portion of the support for the upper row of automobiles of a length for supporting engagement by a single automobile only and extending into the path of movement of the automobiles to and from the lower support to provide sufficient clearance for automobiles to pass through the opening for the upper row, said terminal portion comprising a series of separate support sections at each side of the space occupied by the upper row of automobiles, said support sections being independently removable from said path.

3. Automobile storage means comprising supports for supporting automobiles in vertically spaced rows and having an entrance opening for the upper row restricted in size by structure of said means, the terminal portion of the support for the upper row of automobiles being of a length for supporting engagement by a single automobile only and hingedly supported at its inner end in continuation of the remainder thereof on a substantially horizontal axis and extending into the path of movement of the automobiles to and from the lower support to provide clearance for automobiles to pass through said opening, said terminal portion when swung to a certain position being removed from said path.

4. Automobile storage means comprising supports for supporting automobiles in vertically spaced rows and having an entrance opening for the upper row restricted in size by structure of said means, the terminal portion of the support for the upper row of automobiles being of a length for supporting engagement by a single automobile only and hingedly supported at its inner end in continuation of the remainder thereof on a substantially horizontal axis and extending into the path of movement of the automobiles to and from the lower support to provide clearance for automobiles to pass through said opening, said terminal portion when swung to a certain position being removed from said path, and means for counterweighting said terminal portion.

5. An automobile-car comprising an underframe, an enclosing structure mounted on said underframe and containing an opening in an end wall for the passage of the automobiles into and out of the car, a support for an upper row of automobiles to which the automobiles are applied at the upper elevation, the terminal portion of said support extending within the boundaries of said enclosing structure and, adjacent said opening, into the path of movement of the automobiles moving into and out of the car and forming a row below said upper row, said terminal portion being adapted for removal from said path, and a relatively deep and rigid cross beam above said opening at the end of the car connecting the side walls of the car whereby the top of said opening is substantially lower than the roof of the car and said terminal portion being inclined downwardly away from the support to enable the automobiles of the upper row to enter beneath said beam.

6. An automobile-car comprising an underframe, an enclosing structure mounted on said underframe and containing an opening in an end wall for the passage of the automobiles into and out of the car, beam means across the top of said opening connecting the side walls of the structure, and a support for an upper row of automobiles to which the automobiles are applied at the upper elevation, the terminal portion of said support extending within the boundaries of said enclosing structure and, adjacent said opening, permanently connected with the car and extending into the path of movement of the automobiles moving into and out of the car to enable automobiles of the upper row to travel beneath said beam means and forming a row below said upper row, said terminal portion being adapted for removal from said path.

7. An automobile-car comprising an underframe, an enclosing structure mounted on said underframe and containing an opening in an end wall for the passage of the automobiles into and out of the car, structural means across the top of said opening connecting the walls of the enclosing structure, and a support for an upper row of automobiles to which the automobiles are applied at the upper elevation, the terminal portion of said support extending within the boundaries of said enclosing structure and, adjacent said opening to enable automobiles to pass beneath said structural means through said opening, hinged to the car and extending into the path of movement of the automobiles moving into and out of the car and forming a row below said upper row, said terminal portion when swung on its hinge to a certain position being removed from said path.

8. An automobile-car comprising an underframe, an enclosing structure mounted on said underframe and containing an opening in an end wall for the passage of the automobiles into and out of the car, beam means across the top of said opening connecting the side walls of the structure, and a support for an upper row of automobiles to which the automobiles are applied at the upper elevation, the terminal portion of said support extending within the boundaries of said enclosing structure adjacent said opening at an inclination to enable automobiles of the upper row to pass beneath said beam means, into the path of movement of the automobiles moving into and out of the car and forming a row below said upper row, said terminal portion comprising a series of separate support sections at each side of the car, said support sections being independently removable from said path.

9. An automobile-car comprising an underframe, an enclosing structure mounted on said underframe and containing an opening in an end wall for the passage of the automobiles into and out of the car, beam means across the top of said opening connecting the side walls of the structure, and a support for an upper row of automobiles the terminal portion of which adjacent said opening is hingedly supported at its inner end on a substantially horizontal axis and normally disposed at an inclination to enable automobiles of the upper row to pass beneath said beam means, said terminal portion extending into the path of movement of the automobiles moving into and out of the car and forming a row below said upper row, said terminal portion being displaceable from said path.

10. An automobile-car comprising an underframe, an enclosing structure mounted on said underframe and containing an opening in an end wall for the passage of the automobiles into and out of the car, beam means across the top of said opening connecting the side walls of the structure, a support for an upper row of automobiles the terminal portion of which adjacent said opening is hingedly supported at its inner end on a substantially horizontal axis and normally disposed at an inclination to enable automobiles of the upper row to pass beneath said beam means, said terminal portion extending into the path of movement of the automobiles moving into and out of the car and forming a row below said upper row, said terminal portion when swung into a certain position being removed from said path, and counterweighting means for said terminal portion.

11. Automobile storage means comprising supports for supporting automobiles in vertically spaced rows, a roof thereover, reinforcing means at one end of said roof over the entrance opening, the terminal portion of the support for the upper row of automobiles extending within the space occupied by the stored automobiles and inclining downwardly to enable automobiles of said upper row to pass beneath the said reinforcing means, said terminal portion extending into the path of movement of the automobiles to and from the lower support and adapted for removal from said path.

12. An automobile-car comprising an underframe, an enclosing structure mounted on said underframe and containing an opening in an end wall for the passage of the automobiles into and out of the car, a support for an upper row of automobiles to which the automobiles are applied at the upper elevation, the terminal portion of said support extending within the boundaries of said enclosing structure and, adjacent said opening, inclining downwardly into the path of movement of the automobiles moving into and out of the car and forming a row below said upper row, said terminal portion being adapted for removal from said path, the top of said opening being substantially lower than the roof of the car, and a relatively deep and rigid cross beam above said opening at the end of the car, the inclination of said terminal portion enabling automobiles of the upper row to travel beneath said beam.

13. An automobile-car having an underframe, an enclosing structure mounted on said underframe and containing an opening in an end wall for the passage of the automobiles into and out of the car, said underframe forming a continuous track enabling travel of and forming a support for a lower row of automobiles depressed at the central portion of the car, and means for supporting, in said enclosing structure, an upper row of the automobiles applied to said means at the upper elevation, the terminal portion of said means extending within the boundaries of said enclosing structure and, adjacent said opening, into the path of movement of the automobiles moving onto, and from, the lower support, said terminal portion being normally downwardly and outwardly inclined, adapted for removal from said path.

14. An automobile-car having an underframe, an enclosing structure mounted on said underframe and containing an opening in an end wall for the passage of the automobiles into and out of the car, a beam over said opening, said underframe forming a support for a lower row of automobiles depressed at the central portion of the car, and means for supporting, in said enclosing structure, an upper row of the automobiles applied to said means at the upper elevation, the terminal portion of said means extending within the boundaries of said enclosing structure and, adjacent said opening, inclining downwardly to enable automobiles of the upper row to travel beneath said beam, said terminal portion extending into the path of movement of the automobiles moving onto, and from, the lower support, said terminal portion being adapted for removal from said path.

15. An automobile-car having an underframe, an enclosing structure mounted on said underframe and comprising side walls, end walls and a roof portion, one of said end walls containing an opening for the passage of the automobiles into and out of the car, beam means at the top of said opening connecting the side walls of the car, said underframe forming a support for a lower row of automobiles, supporting means for an upper row of the automobiles to which the automobiles are applied at the upper elevation, the terminal portion of said supporting means extending within the boundaries of said enclosing structure and, adjacent said opening, inclining downwardly into the path of movement of the automobiles moving into and out of the car and forming the lower row, the inclination of the terminal portion enabling automobiles of the upper row to pass beneath the beam means, said terminal portion being adapted for removal from said path and said roof portion being lower at the ends thereof than at its central portion, and grab-irons extending upwardly from the ends of said roof portion.

16. An automobile-car having an underframe, an enclosing structure mounted on said underframe and comprising side walls, end walls and a roof portion, said end walls containing openings for the passage of the automobiles into and out of the car, said underframe forming a support for a lower row of automobiles, supporting means for an upper row of the automobiles to which the automobiles are applied at the upper elevation, the terminal portions of said supporting means extending within the boundaries of said enclosing structure and, adjacent said openings, inclining downwardly into the path of movement of the automobiles moving into and out of the car and forming the lower row, said terminal portions being adapted for removal from said path and said roof portion being lower at the ends thereof than at its central portion, the inclination of said terminal portions enabling the automobiles of the upper row to travel beneath the ends of the roof toward and away from the central portion and grab-irons extending from the ends of said roof portion.

17. An automobile-car comprising an underframe, an enclosing structure mounted on said underframe and containing an opening in each of its end walls for the passage of the automobiles into and out of the car, a beam disposed across the top of said opening connecting the side walls of the structure, and a support for an upper row of the automobiles to which the automobiles are applied at the upper elevation, the terminal portions of said support extending within the boundaries of said enclosing structure and, adjacent said openings, inclining downwardly into the path of movement of the automobiles moving into and out of the cars and forming a row below said upper row, the inclination of said terminal portions enabling automobiles of the upper row to travel beneath said beam, said terminal portions being adapted for removal from said path.

18. Automobile storage means comprising a lower support for a lower row of automobiles and an upper support for an upper row of automobiles comprising a section fixed at the upper elevation and having a hingedly supported terminal portion extending within the space occupied by the stored automobiles and into the path of movement of automobiles to and from said lower support, beam means disposed over the entrance to the terminal portion, and means connected to said beam means and said terminal portion operable to swing the terminal portion into a position in which it is removed from said path.

19. An automobile car having an underframe, an enclosing structure mounted on said underframe and containing an opening in each end wall thereof for the passage of automobiles into and out of the car, said underframe forming a support for a lower row of automobiles, said enclosing structure comprising posts secured to, and rising from, said underframe at opposite sides of the car, certain of said posts being located at the ends of the car, cross members connected at opposite ends with the intermediate ones only of said posts, deep cross members connected with the end ones of said posts and located at the ends of the car at the tops of said openings and a roof portion, and means supported by said first-named cross members for supporting an upper row of automobiles, the terminal portions of said means extending within the boundaries of said enclosing structure and into the path of movement of the automobiles moving onto, and from, said support to enable automobiles to travel on the terminal portions beneath said deep cross members, and said terminal portions being adapted for removal from said path.

20. An automobile car having an underframe, an enclosing structure mounted on said underframe and containing an opening in an end wall thereof for the passage of automobiles into and out of the car, said underframe forming a support for a lower row of automobiles, said enclosing structure comprising posts secured to and rising from said underframe at opposite sides of the car, certain of said posts being located at said end of the car, cross members connected at opposite ends with the intermediate ones only of said posts, deep cross members connected with the end ones of said posts and located at the said end of the car at the tops of said openings, and a roof portion, and means supported by said first named cross members for supporting an upper row of automobiles, the terminal portions of said means extending within the boundaries of said enclosing structure and into the path of movement of the automobiles moving on to and from said support and adapted for removal from said path.

RAYMOND C. PIERCE.